(12) United States Patent
Ramesh et al.

(10) Patent No.: US 12,705,242 B2
(45) Date of Patent: Aug. 11, 2026

(54) SYSTEM AND METHOD FOR CACHING OBJECT DATA IN A CLOUD DATABASE SYSTEM

(71) Applicant: Teradata US, Inc., San Diego, CA (US)

(72) Inventors: Bhashyam Ramesh, Secunderabad (IN); Stephen Brobst, Henderson, NV (US); Shambhu Sree Vegunta, Hyderabad (IN); Chandrasekhar Tekur, Hyderabad (IN); Diwakar Mishra, Hyderabad (IN); Bhargav Reddi, Andhra Pradesh (IN)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 18/372,921

(22) Filed: Sep. 26, 2023

(65) Prior Publication Data

US 2025/0103595 A1 Mar. 27, 2025

(51) Int. Cl.
*G06F 16/2455* (2019.01)
*G06F 16/25* (2019.01)

(52) U.S. Cl.
CPC ...... *G06F 16/24552* (2019.01); *G06F 16/254* (2019.01)

(58) Field of Classification Search
CPC ......................... G06F 16/24552; G06F 16/254
See application file for complete search history.

(56) References Cited

U.S. PATENT DOCUMENTS

| | | | | |
|---|---|---|---|---|
| 10,108,686 | B2 * | 10/2018 | Dageville | G06F 16/148 |
| 11,429,397 | B1 * | 8/2022 | Deokule | H04L 67/1095 |
| 11,941,014 | B1 * | 3/2024 | Das | G06F 16/219 |
| 2014/0032595 | A1 * | 1/2014 | Makkar | G06F 16/25 707/E17.044 |
| 2021/0056036 | A1 * | 2/2021 | Breslow | H03M 7/3088 |
| 2021/0216553 | A1 * | 7/2021 | Gale | G06F 16/24552 |
| 2022/0357958 | A1 * | 11/2022 | Deokule | H04L 67/10 |
| 2022/0374431 | A1 * | 11/2022 | Kavali | G06F 16/2471 |
| 2024/0221039 | A1 * | 7/2024 | Burger | G06Q 30/0629 |

* cited by examiner

*Primary Examiner* — Jared M Bibbee
(74) *Attorney, Agent, or Firm* — Randy L. Campbell, Jr.

(57) ABSTRACT

In a cloud database system employing multiple types of storage, such as external object store, managed object store. block storage, and compute node memory, each type of storage having different kinds of file organization, different types of data organization, different forms of storage access, and different latency and throughput costs, a system and method for caching different data transformations created during query executions involving different data stores. Transformed versions of data read from external object storage are saved to a multi-layered warehouse cache for use in subsequent query executions.

21 Claims, 7 Drawing Sheets

SYSTEM AND METHOD FOR CACHING OBJECT DATA IN A CLOUD DATABASE SYSTEM

FIELD OF THE INVENTION

This invention relates generally to database management systems and external object storage systems, and more particularly to systems and methods for caching object data to improve workload performance and costs within database management systems employing external cloud storage, such as public and private cloud storage solutions including Amazon Web Services (AWS), Microsoft Azure, Google Cloud, IBM Cloud, and others.

BACKGROUND OF THE INVENTION

A cloud native database is a database that is designed and architected to operate on the cloud with the capability to perform all of the functions of a traditional data warehouse, including data processing, collation, integration, cleansing, loading, reporting, and so on. Teradata Corporation VantageCloud Lake is a cloud native database system designed to automatically leverage elastic, fully isolated multi-compute clusters, as well as highly scalable, elastic, durable and cost-optimized object storage, such as Amazon Simple Storage Service (Amazon S3), so that customers can quickly and easily respond and adapt to changing business needs.

Teradata Corporation VantageCloud Lake offers compute elasticity capable of running database queries at higher levels of parallelism which can potentially deliver better response times. These higher speeds generally come at an extra cost to the customer who must weigh the tradeoffs between price and performance within the context of their business requirements. To facilitate such decisions, systems and methods for analyzing query workloads on already installed customer systems and generating tiered offers are presented below. Such offers promote higher speeds in the form of better response times for a selected portion of queries in exchange for a higher price. Upon selecting an offer, the system will automatically resize selected compute clusters as necessary to provide improved performance and execute future instances of the promoted queries to take advantage of the resized compute cluster configuration.

BRIEF DESCRIPTION OF THE DRAWINGS

Some implementations of the present disclosure are described with respect to the following figures.

DETAILED DESCRIPTION OF THE INVENTION

Figure 1:
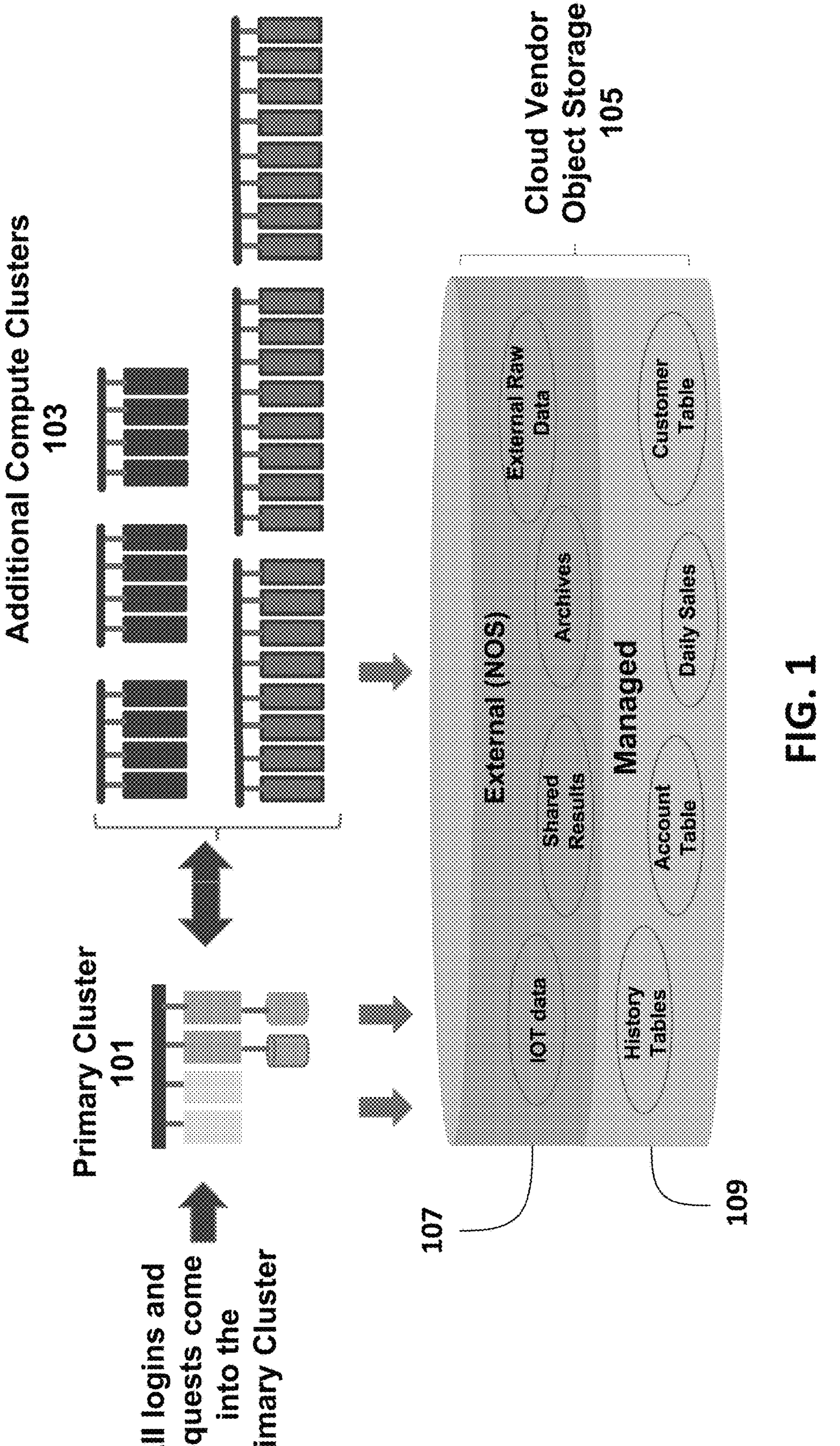
FIG. 1 is a block diagram of an example cloud native database arrangement that includes one or more database management nodes and an object-based remote data store.

FIG. 1 provides a basic block diagram of a VantageCloud Lake database environment. The major components of this system include a primary compute cluster 101, an analytics database forming the hub of the system environment; optional additional compute clusters 103, independent compute resources used to offload compute-intensive query steps from primary cluster 101; and cloud object storage 105 housing data which consists of data in external object storage 107 accessed using native object store (NOS) and owned and managed outside the database; and managed data 109 such as user tables, especially large tables, that are part of the database and can be shared by all compute clusters 103, but stored in cloud storage to reduce storage costs.

A parallel, scalable network connection is provided between primary cluster 101 and multiple compute clusters 103. This connection provides load balancing between multiple compute clusters and transfers finalized query steps to the compute clusters for execution.

Figure 2:
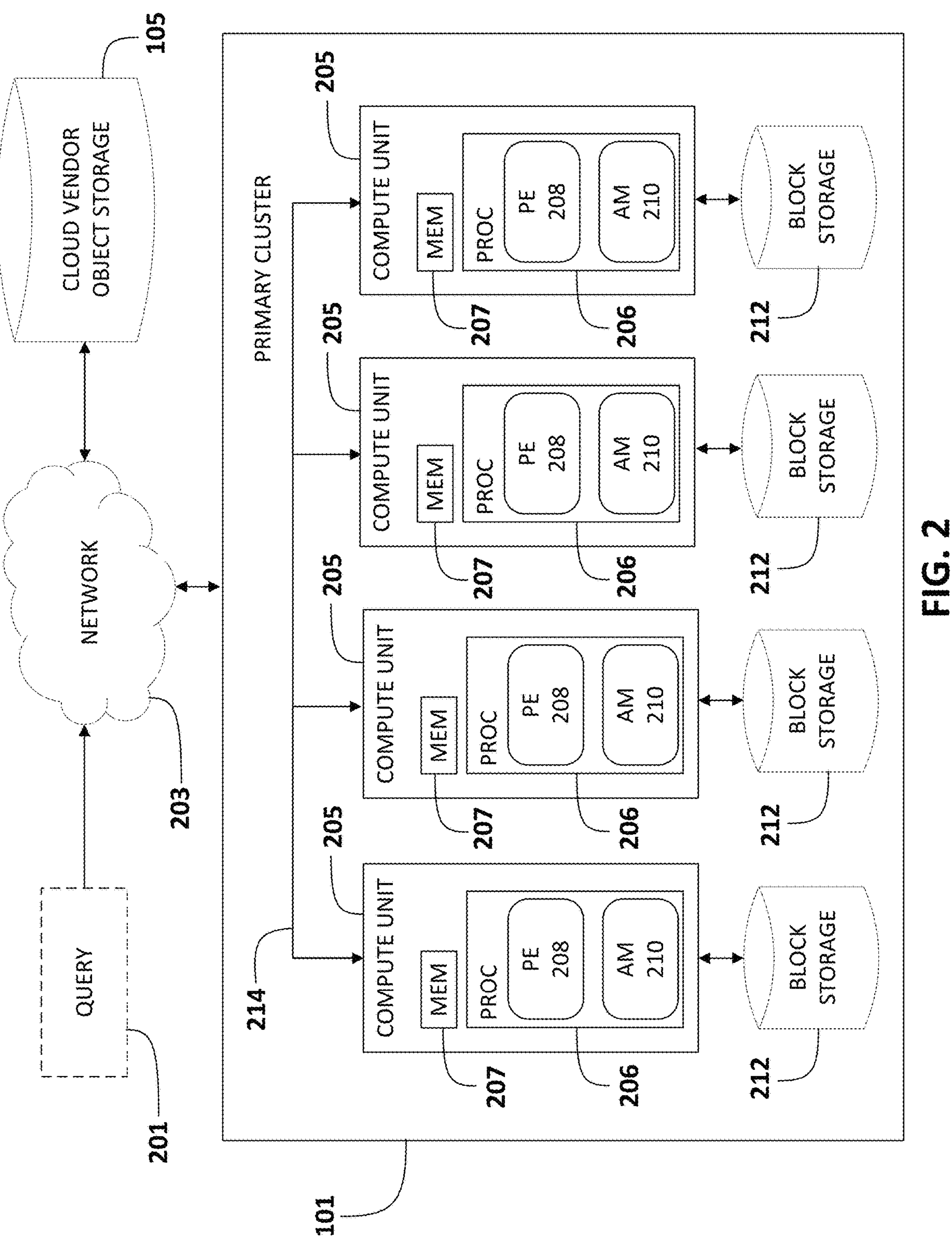
FIG. 2 is a block diagram of a database management node cluster encompassing a database management system.

Primary cluster 101 contains a database management system (DBMS) consisting of one or more network compute units or nodes 205 that manage the storage, retrieval, and manipulation of data stored on one or more block storage disks 212 as shown in FIG. 2. The database management system may be a combination of software (e.g., computer program routines, subroutines, applications, etc.) and hardware (e.g., processors, memory, etc.).

Generally, requests in the form of queries 201 are transmitted via a network 203 to the primary cluster 101, and responses are received therefrom. The database management system of primary cluster 101 performs the workload comprised of the one or more queries 201 against a relational database comprised of one or more tables storing data. Specifically, the database management system performs the functions described below, including accepting the workload comprised of the queries 201, generating one or more query execution plans (QEPs) from the queries 201, and then performing the query execution plans to process data retrieved from the tables. Moreover, the results from these functions may be provided directly to clients, may be provided to other systems (not shown) by network 203, or may be stored by the data management system in the database.

As shown in FIG. 2, primary cluster 101 is connected to cloud-based store 105 via a cloud network interface 203, wherein the cloud-based store 105 stores one or more objects (not shown), such as one or more datasets storing data. The cloud-based store 105 may be a distributed object store such as Amazon Simple Storage Service (Amazon S3), or a distributed file system such as Hadoop Distributed File System (HDFS). The database management system may retrieve the data from the objects in the cloud-based store 105, wherein the data is then stored in the relational database for use by the database management system in processing queries 201.

In one example, each compute unit 205 may include one or more physical processors 206 and memory 207. The memory 207 may include one or more memories and may be computer-readable storage media or memories, such as a cache, buffer, RAM, removable media, hard drive, flash drive, or other computer-readable storage media. Computer-readable storage media may include various types of volatile and nonvolatile storage media. Various processing techniques may be implemented by the processors 206 such as multiprocessing, multitasking, parallel processing and the like, for example.

The compute units 205 may include one or more other processing units such as parsing engine (PE) modules 208 and access modules (AM) 210. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors.

The parsing engine modules 208 and the access modules 210 may each be virtual processors (vprocs) and/or physical processors. In the case of virtual processors, the parsing engine modules 208 and access modules 210 may be executed by one or more physical processors, such as those that may be included in the compute units 205. For example, in FIG. 2, each parsing engine module 208 and access module 210 is associated with a respective compute unit 205 and may each be executed as one or more virtual processors by physical processors 206 included in the respective compute unit 205.

In FIG. 2, each compute unit 205 may include multiple parsing engine modules 208 and access modules 210, such that there are more parsing engine modules 208 and access modules 210 than compute units 205.

The database management system stores data in one or more tables in block storage 212. In one example, the database system may be configured to distribute rows across access modules 210 and their associated block storage 212. These rows may include rows read from object store 105. Each parsing engine module 108 may organize the storage of data and the distribution of table rows and columns. The parsing engine modules 208 may also coordinate the retrieval of data from block storage 212 in response to queries received through connection with network 203. Network 203 may be wired, wireless, or some combination thereof. Network 203 may be a virtual private network, web-based, directly connected, or some other suitable network configuration.

Figure 3:
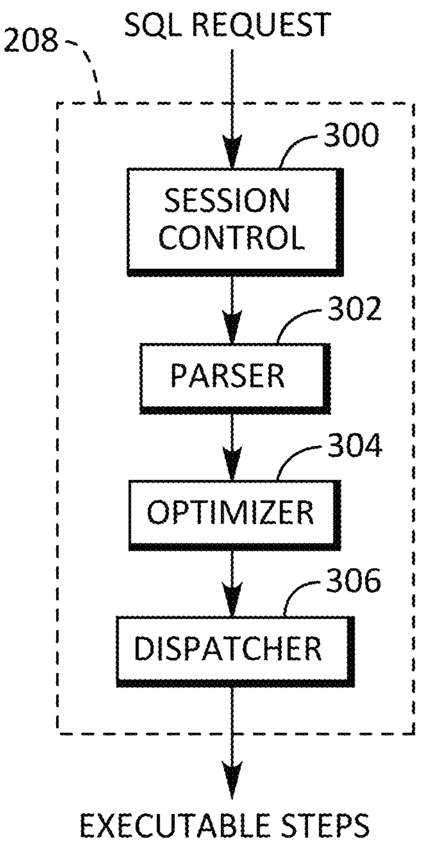
FIG. 3 is a block diagram of a parsing engine module within the example database management node cluster of FIG. 2.

In one example system, each parsing engine module 208 includes four primary components: a session control module 300, a parser module 302, an optimizer 304, and a dispatcher module 306 as shown in FIG. 3. The session control module 300 provides the logon and logoff functions. It accepts a request for authorization to access the database, verifies it, and then either allows or disallows the access. Once the session control module 300 allows a session to begin, an SQL request may be received such as through submission by a user and the SQL request is routed to the parser module 302.

Figure 4:
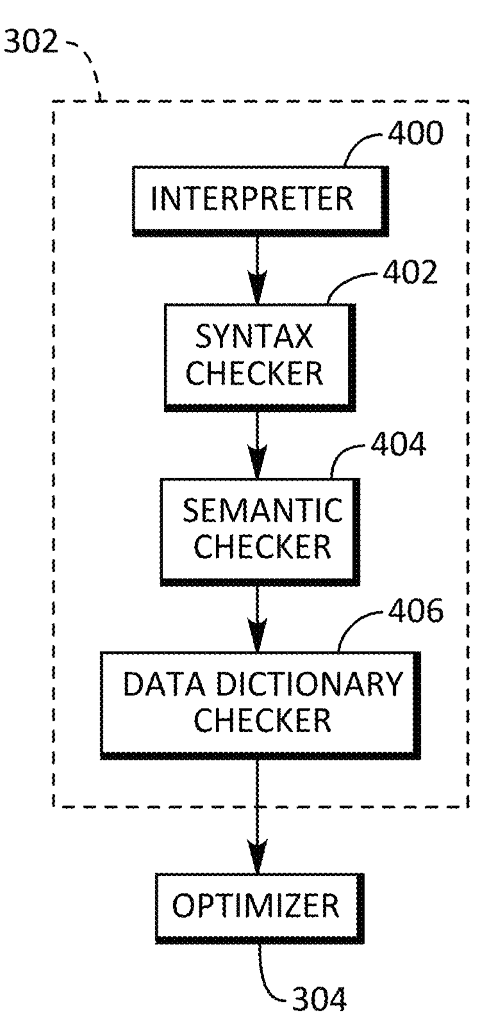
FIG. 4 is a block diagram of a parser module within the example database database management node cluster of FIG. 2.

As illustrated in FIG. 4, the parser module 302 may include an interpreter module 400 that interprets the SQL request. The parser module 302 may also include a syntax checker module 402 that checks the request for correct SQL syntax, as well as a semantic checker module 404 that evaluates the request semantically. The parser module 302 may additionally include a data dictionary checker 406 to ensure that all of the objects specified in the SQL request exist and that the user has the authority to perform the request. The parsing engine module 208 implements the optimizer module 304 to select the least expensive plan to perform the request, and the dispatcher 306 coordinates the runtime execution of executable steps of the query execution plan of the optimizer module 304 with the access modules 210.

Selecting the optimal query-execution plan may include, among other things, identifying which primary cluster 101, compute clusters 103, and compute units 205 are involved in executing the query and which database tables are involved in the query, as well as choosing which data-manipulation techniques will serve best in satisfying the conditions of the query. To this end, for each parsing engine module 208, the parser module 302 (see FIG. 3), and/or optimizer module 304 may access a data dictionary module (not shown) specifically for parsing engine module 208.

The data dictionary module may specify the organization, contents, and conventions of one or more databases, such as the names and descriptions of various tables maintained by database management system as well as fields of each database, for example. Further, the data dictionary module 406 may specify the type, length, and/or other various characteristics of the stored tables. The database management system typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system separately or in conjunction with SQL. The data dictionary may be stored in block storage disks 212 or some other storage device and selectively accessed.

Referring again to FIG. 2, an interconnection 214 allows communication to occur within and between each compute unit 205. For example, implementation of the interconnection 214 provides media within and between each compute unit 205 allowing communication among the various processing units. Such communication among the compute units may include communication between parsing engine modules 208 associated with the same or different compute units 205, as well as communication between the parsing engine modules 208 and the access modules 210 associated with the same or compute units 205. Through the interconnection 214, the access modules 210 may also communicate with one another within the same associated compute unit 205 or other compute units 205.

The interconnection 214 may be hardware, software, or some combination thereof. In instances of at least a partial-hardware implementation the interconnection 214, the hardware may exist separately from any hardware (e.g, processors, memory, physical wires, etc.) included in the compute units 205 or may use hardware common to the compute units 205. In instances of at least a partial-software implementation of the interconnection 214, the software may be stored and executed on one or more of the memories 207 and processors 206 of the compute units 106 or may be stored and executed on separate memories and processors that are in communication with the compute units 205. In one example, interconnection 214 may include multi-channel media such that if one channel ceases to properly function, another channel may be used. Additionally, or alternatively, more than one channel may also allow distributed communication to reduce the possibility of an undesired level of communication congestion among compute units 205.

Compute clusters 103 exist as separate clusters of network-connected nodes independent of primary cluster 101.

Each compute cluster 103 is separate and may be specialized. Compute clusters 103 enable the extension and scaling of system compute power.

Figure 5:
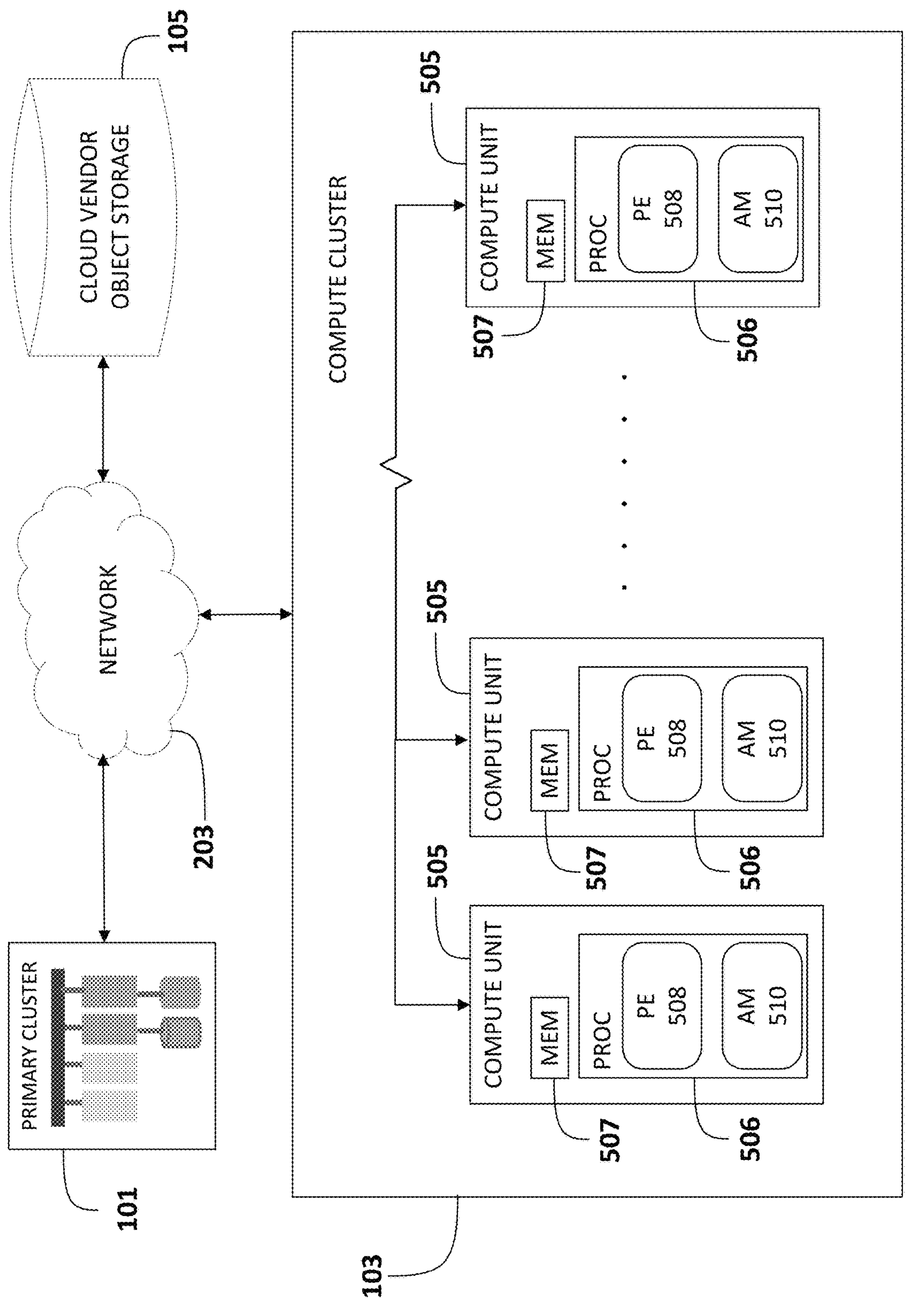
FIG. 5 is a block diagram of a compute node cluster.

As shown in FIG. 5, compute clusters 103 may contain one or more compute units or nodes 505, wherein each node 505 may include one or more physical processors 506 and memories 507. Compute clusters 103 include one or more parsing engine modules 508 and access modules 510, but unlike primary cluster 101, the compute clusters 103 do not have any persistent block storage for user data. Compute clusters 103 depend on the primary cluster parsing module 208 and optimizer 304 to direct the steps that the compute cluster will execute on behalf of a query. No query planning takes place on the compute cluster.

Compute clusters 103 do not have any permanent data. A data dictionary structure exists on a compute cluster, but it serves only the transient needs of the compute cluster. It does not contain table or column descriptions or details about statistics, indexes, or privileges. All that detail is maintained in primary cluster 101.

A compute cluster 103 can read large tables in object storage 105. It can also hold intermediate data, keeping it in memory or in internal drives.

Elasticity and extensible compute power is provided to the database platform via different quantities, configurations, and sizes of compute clusters 103. Each compute cluster 103 stands alone and executes queries that access object storage 105 to perform compute-intensive work such as analytic functions, freeing up primary cluster 101 to perform session management, parsing engine work, and tactical or other short-term work.

Depending on workload, a compute configuration may employ compute clusters having differing quantities of compute nodes 505 and processing capability. A compute cluster having a greater number of compute units or nodes 505 will accordingly have more processors 506, memory 507, access modules 510. With more access modules, a query or task assigned to a larger compute cluster can execute at a higher level of parallelism and deliver faster response times. Compute clusters can be categorized as either Small, Medium, Large, or X-Large depending upon the number of compute units or nodes 505 contained in a compute cluster 103.

A compute configuration may employ zero or many compute clusters, with compute clusters being added or removed to the configuration to meet workload needs. A compute configuration with zero compute clusters would consist of only primary cluster 101. Groupings of compute clusters can automatically scale up additional compute clusters based on resource demand or the number of active queries.

The optimizer 304 in the primary cluster 101 determines which query steps go to a compute cluster 103 and builds a query plan. During optimization, the work that a query needs to accomplish is broken into several steps. Some of these steps will execute on primary cluster 101, and if appropriate privileges are in place, some steps will execute on a compute cluster 103. Even if there are several compute clusters within a cluster configuration, a single query can only execute steps in one compute cluster. An execution plan may include processing a query step or two in primary cluster 101, and then processing one or more steps on a compute cluster 103. The compute cluster parsing engine 508 receives the query plan from primary cluster 101 and is responsible for dispatching steps down to the compute cluster access modules 510 for execution. When to use a compute cluster 103, what compute clusters to use, and the quantity of clusters to use, is determined by the optimizer in primary cluster 101 at the time the initial query plan is built.

Each cluster in the database environment is independent and isolated from other clusters, though queries can span a primary cluster 101 and one or more compute clusters 103 with communication between primary cluster 101 and compute clusters 103 occurring through a network connection 203. Data and instructions about how to execute query 201 may be transmitted between the primary and compute clusters by means of a data access layer referred to as a data fabric, such as QueryGrid provided by Teradata Corporation. Results generated by compute clusters 103 are provided through the network or data fabric back to primary cluster 101.

As described above and illustrated in FIGS. 1 through 5, the cloud database system employs multiple types of storage, such as external object store 107, managed object store 109. block storage 212, and compute unit memory 207, each type of storage having different kinds of file organization, different types of data organization, different forms of storage access, and different latency and throughput costs.

During application and query execution, the primary cluster 101 and compute clusters 103 may each require access to data stored within object storage 105. However, the data stored within object storage 105 may need to be transformed to a different file or storage system or format for execution by a specific application or may need to be temporarily moved to a storage or cache memory providing improved access to satisfy performance requirements or service level goals (SLGs) demanded by an application or customer.

Figure 6:
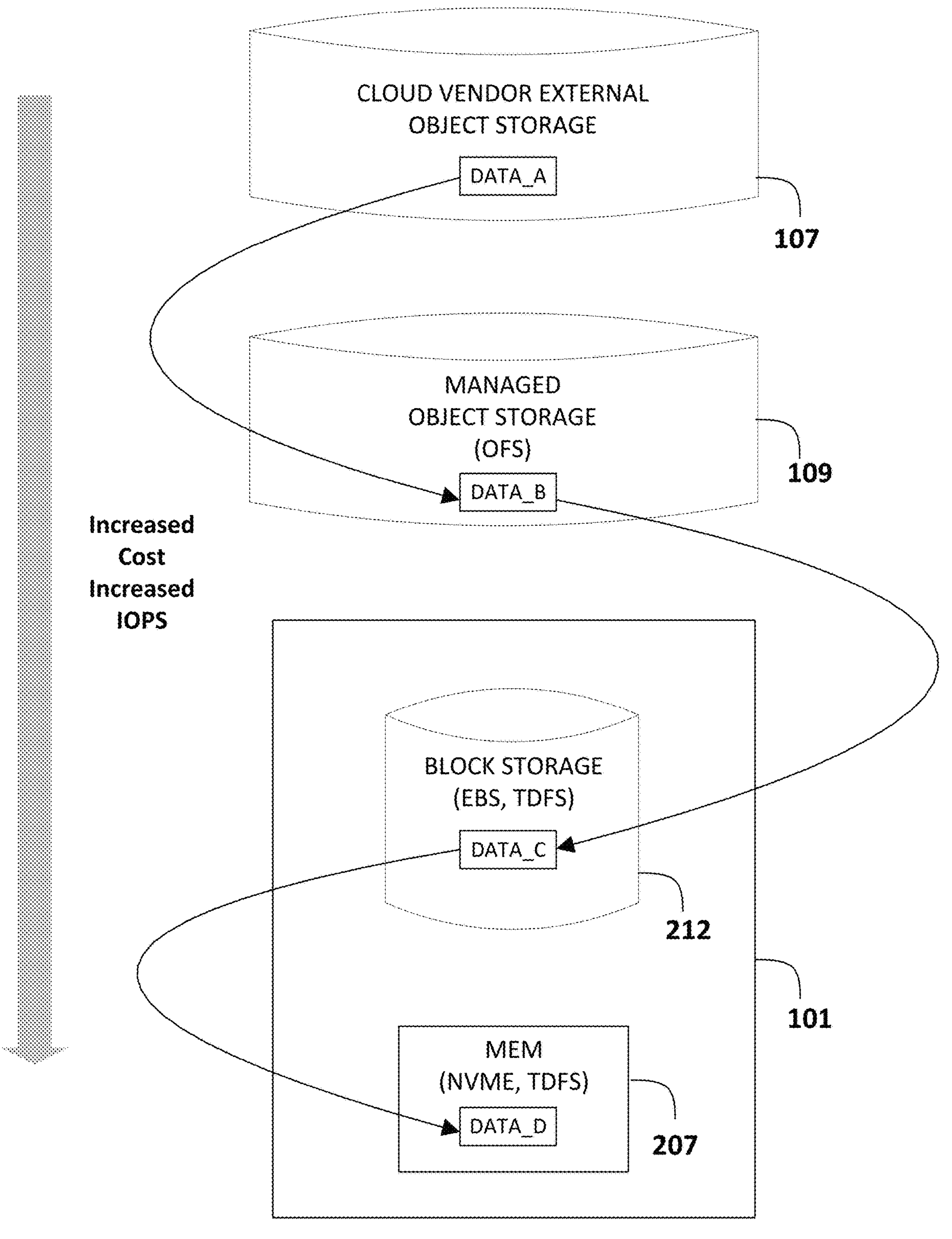
FIG. 6 provides an illustration of the multiple types of storage employed within the cloud database system of FIG. 1 and the storage, transfer and caching of data among the storage types.

FIG. 6 provides an illustration of the multiple types of storage employed within the cloud database system and the storage, transfer and caching of data among the storage types. DATA_A represents data in external cloud object storage 107 such as AWS S3, Google GCS, or Azure Blob. Querying data stored within object storage 107 is generally less efficient or more time consuming than querying data stored within managed object storage 109, block storage 212, or compute unit memory 207.

DATA_B represents this same data saved in managed object storage 109. Within managed object store 109, data is saved using Teradata Corporation object file system (OFS), a file system used to store database objects such as tables, views, macros, triggers, and stored procedures. OFS is a Teradata Corporation proprietary file system that is optimized for database operations.

DATA_C represents this same data saved temporarily in block storage 212. Within block storage 212, data is saved using Teradata Database File System (TDFS). TDFS stores data in physical rows, each row including a row header (metadata that includes a unique row ID) and stored data. Each physical row stores one of several kinds of data, such as a table row, a series of one or more column partition values, a table header (metadata for a table, and index data structures.

DATA_D represents the same data stored temporarily within higher performance memory 207, such Non Volatile Memory Express (NVMe) memory to provide higher throughput and faster response times during workload execution.

As stated above, the data stored within object storage 107 (DATA_A) may need to be transformed to a different file or storage system or format for execution by a specific application or may need to be temporarily moved to a storage or cache memory providing improved access to satisfy performance requirements or SLGs demanded by an application or customer. Similarly, data stored in managed object store 109 (DATA_B) or block storage 212 (DATA_C) may be transformed and cached to a different storage to provide improved performance.

DATA_A, DATA_B, DATA_C and DATA_D represent different versions, forms, formats, structures, or organizations of the same data. These different data versions may include associated metadata to aid with storage, processing and use of the data.

Having gone through the cost of doing transfer of data from one storage system to another providing improved performance, there is a benefit to retaining the transformed data version and associated metadata when the data will be accessed multiple times.

Transfer costs also include transformational costs in addition to data access costs—transformation to a different file system, to JavaScript Object Notation (JSON), to some other format, to timestamp in multiple formats, or to a form that is ideal for processing by a specific application. Keeping multiple copies of the data in multiple formats (DATA_A, DATA_B, DATA_C and DATA_D) can provide improvements in read throughput and response times. Storing these different forms and determining which to access can provide a significant bottom-line benefit to application or query performance.

Figure 7:
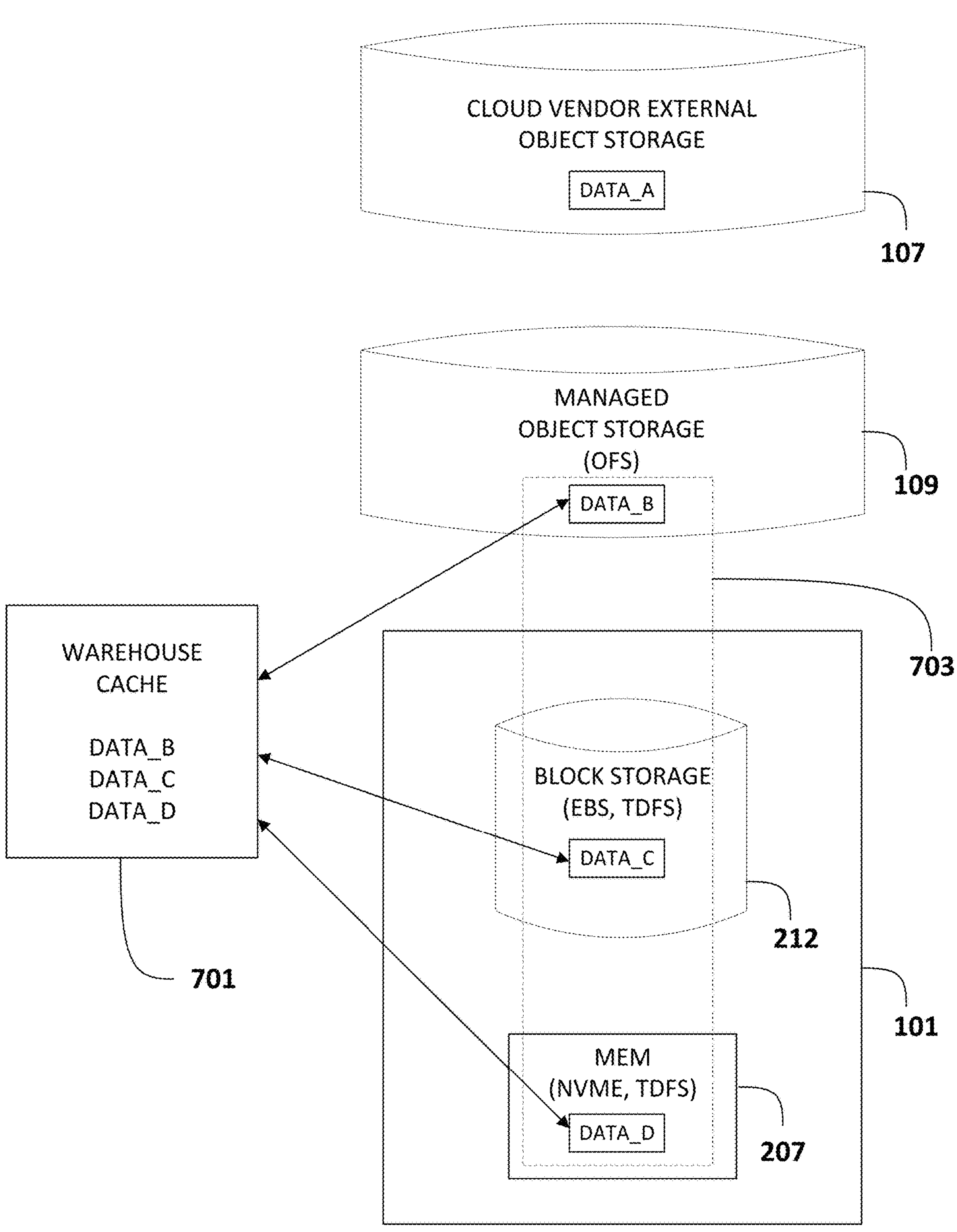
FIG. 7 provides an illustration of a cloud database system warehouse cache (WC) for cache storage of data transformations occurring within the cloud database system of FIG. 1 in accordance with the present invention.

FIG. 7 provides an illustration of a cloud database system warehouse cache (WC) 701 for cache storage of data transformations. In FIG. 7, the warehouse cache is seen as containing cached versions of the data transformations DATA_B, DATA_B, and DATA_C created during application executions. Storing these different data transformations within WC 701 and determining which to access during future application executions can provide significant performance benefits.

The warehouse cache 701 may comprise a global cache layer 703 accessible to primary cluster 101 and all compute clusters 103, having a cache hierarchy that can store multiple synchronized data forms that are optimal for access, and having index structures tailored for different applications. Cache layer 703 can use different storage mediums with varying IOPS bandwidth but still offers performance advantages over the cloud and network fabric and reduce transfer costs.

Within this hierarchy, managed OFS 109 can function as a cache for object store data read from external object store 107, this cache having different forms of index structures for faster access to object store data; a TDFS on EBS 212 can function as a cache for data read from external object store 107 or managed OFS 109; and a TDFS on NVME 207 can provide a cache for data read from external object store 107, managed OFS 109, or block storage 212. One or more of this hierarchy can be absent depending on performance needs and use cases.

Cache data in a TDFS cache in either block storage 212 or MVMe memory 207 can have differently organized data using a primary index (PI), join index (JI), Non-Unique Secondary Index (NUSI), or a combination of indexes.

The different caches in the hierarchy may be synced and automatically created establishing a common cache layer connecting to all the caches.

Data external object store 103, OFS 109, and EBS 212 can access a high performance open source layer such as Alluxio to provide a global cache for use by multiple compute instances.

Figure 8:
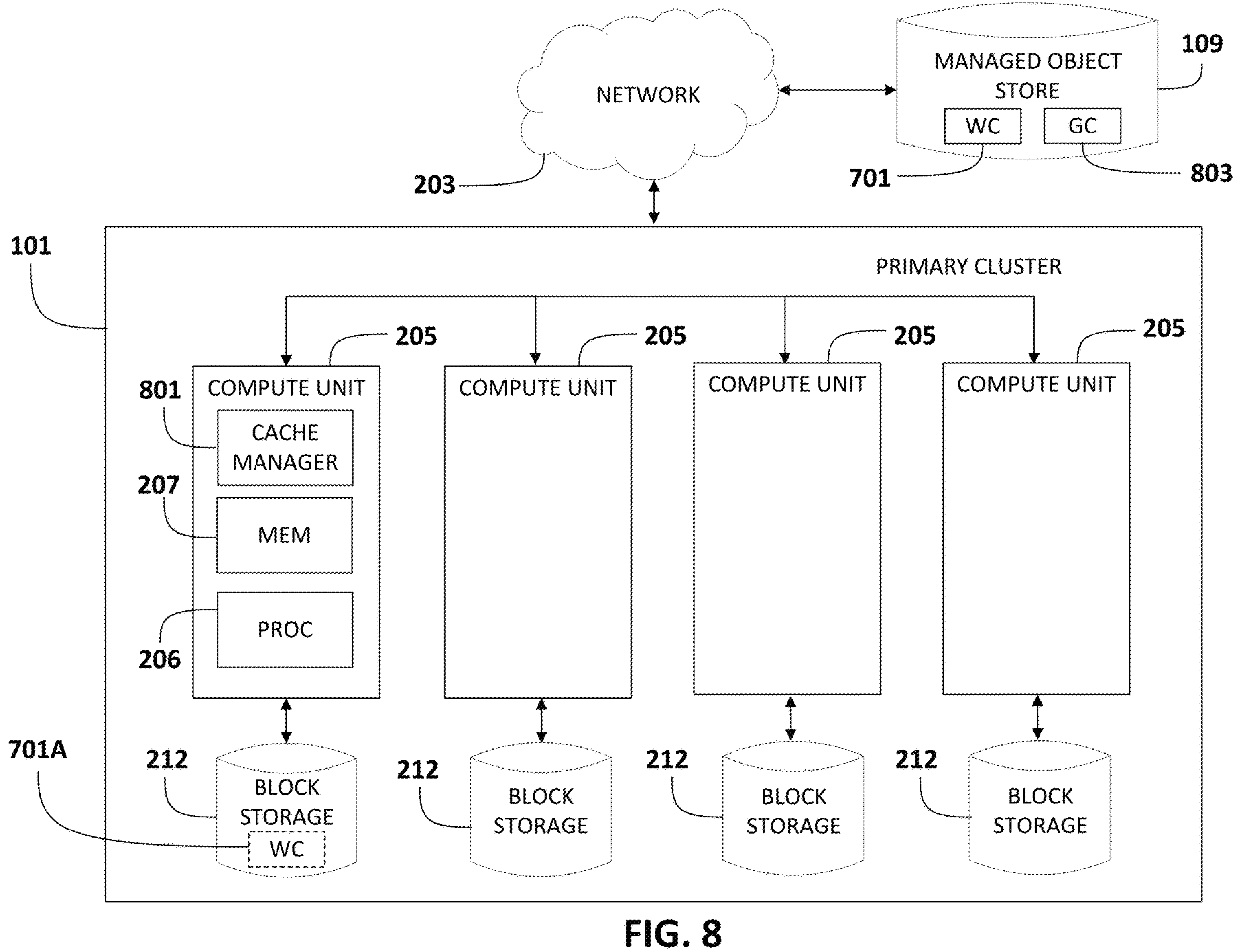
FIG. 8 is a block diagram of a cloud database system including components of a warehouse cache (WC) system in accordance with the present invention.

FIG. 8 is a block diagram of a cloud database system including components of a warehouse cache (WC) system in accordance with the present invention. In one implementation WC 701 can be housed in Teradata OFS 109. WC 701 can also be housed in Teradata block storage 212. It can be housed in both stores in another implementation.

What data to cache can be dynamically determined. Such a determination can be based on access patterns, number of accessors, frequency of access, cost of access, data volume for each access, and such. Other considerations are possible.

A cache manager 801 takes care of what objects to cache and what not to cache, accordingly creating and deleting cache entries dynamically.

Metadata associated with cached data can be maintained in a global catalog (GC) 803 or within the cache manager 801 maintaining information such as what cache layers are available at any point of time.

These multiple layers of cache are maintained in background in an asynchronous manner, meanwhile cached objects still serve read committed/snapshot readers.

Data files may be stored in native S3 format. WC 701 can have metadata or actual data; index data such as synchronized (coherent) materialized view, e.g., join index (JI) in Teradata systems, or secondary indexes; and/or transformed file data. In general, the metadata is used for better IO performance. Transformed data in WC 701 is used for better CPU performance.

Data may be created by Teradata DBMS as S3 objects. In this case the Teradata DBMS will produce either synchronously (inline) or asynchronously metadata in OFS/TDFS-block-storage (WC) followed by open format such as Iceberg/Hudi, etc.

Alternatively, data may be created by external streams directly as S3 objects. In this case the external streams will create the metadata in open-format native to that format. There are three ways to reflect the open format metadata in Teradata DBMS, referred to as called Teradata-native metadata, for superior access performance:

1. In one implementation, the external stream can trigger a background task such as through a lambda function to create the Teradata-native metadata in WC 701 for newly created S3 objects.
2. In a second implementation, when a query accesses a data version for which there is no Teradata-native metadata, the Teradata DBMS system recognizes and triggers a background task to create the Teradata-native metadata in WC 701. Future accesses to the S3 objects will use the Teradata-native metadata in WC 701 for superior performance.
3. In a third implementation, a database trigger will be defined on the catalog entry associated with a S3 object. Any creation of a new version will trigger the creation of the Teradata-native meta-data in WC 701.

Optimizer 304 will make the final decision on use of warehouse cached data and metadata during query executions. By using OFS 109 as a cache for object store 107 data, richer metadata can be stored in OFS to help in better object filtering during query executions. By using TDFS block storage 212 or NVMe storage 207 as a cache for OFS 109 or object store 107 data, converted/aggregate data can be stored in TDFS for frequently accessed data. For object store 107 data, some data can be cached in OFS 109, some in TDFS on EBS 212, and/or some in TDFS on NVMe storage 207, depending on usage patterns and other considerations. Different cache layers can have different index structures of which optimizer 304 can take advantage of during query planning.

The caching techniques described herein provide a unique approach to improve workload performance and costs within database management systems employing external cloud storage. Having gone through the cost of transforming data read from an external object store, there is a benefit to caching the transformed versions of the data when that data will be accessed multiple times.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A database system comprising:

a primary compute cluster including a processor and a non-transitory storage medium containing instructions executable on said processor for executing database management system (DBMS);

at least one additional compute cluster;

multiple data storage systems providing different kinds of file organization, different kinds of data organization, and different forms of storage access, said primary and additional compute clusters having access to said multiple data storage; and a warehouse cache containing transformed versions of data read from a first one of said multiple data storage systems to a second one of said multiple data storage systems during query executions by said compute clusters, said transformed versions of data comprising multiple copies of said data in multiple formats including respective file formats or data formats, said transformed versions of data concurrently stored within said warehouse cache being available for use in subsequent query executions by said compute clusters, and said transformed versions are physically distinct from one another.

2. A database system in accordance with claim 1, wherein said multiple data storage systems include an external cloud object storage and at least one of:

a managed cloud storage;

a block storage; and a database compute node memory.

3. A database system in accordance with claim 2, wherein said transformed versions of data include at least one of:

data read from said external cloud object storage, transformed, and saved as managed data within said managed cloud storage;

data read from said external cloud object storage, transformed, and saved to said block storage;

data read from said managed cloud object storage, transformed, and saved to said block storage;

data read from said external cloud object storage, transformed, and saved to said database compute node memory;

data read from said managed cloud object storage, transformed, and saved to said database compute node memory; and data read from said block storage, transformed, and saved to said database compute node memory.

4. A database system in accordance with claim 1, wherein said transformed versions of data saved to said warehouse cache include metadata associated with said transformed versions of data.

5. A database system in accordance with claim 1, wherein said transformed versions of data saved to said warehouse cache include index data associated with said transformed versions of data.

6. A database system in accordance with claim 1, wherein said warehouse cache comprises multiple caches wherein said transformed versions of data are distributed among different ones of said multiple data storage systems.

7. A database system in accordance with claim 6, wherein said multiple caches are organized in a cache hierarchy that can store multiple synchronized transformed versions of data.

8. In a database system comprising a processor and a non-transitory storage medium containing instructions executable on said processor for executing a database management system (DBMS) and multiple data storage systems accessible to said DBMS providing different kinds of file organization, different kinds of data organization, and different forms of storage access;

the improvement comprising:

a warehouse cache containing transformed versions of data read from a first one of said multiple data storage systems to a second one of said multiple data storage systems during query executions by said DBMS, said transformed versions of data comprising multiple copies of said data in multiple formats including respective file formats or data formats, said transformed versions of data concurrently stored within said warehouse cache being available for use in subsequent query executions by said DBMS, and said transformed versions are physically distinct from one another.

9. A database system in accordance with claim 8, wherein said multiple data storage systems include an external cloud object storage and at least one of:

a managed cloud storage;

a block storage; and a database compute node memory.

10. A database system in accordance with claim 9, wherein said transformed versions of data include at least one of:

data read from said external cloud object storage, transformed, and saved as managed data within said managed cloud storage;

data read from said external cloud object storage, transformed, and saved to said block storage;

data read from said managed cloud object storage, transformed, and saved to said block storage;

data read from said external cloud object storage, transformed, and saved to said database compute node memory;

data read from said managed cloud object storage, transformed, and saved to said database compute node memory; and data read from said block storage, transformed, and saved to said database compute node memory.

11. A database system in accordance with claim 8, wherein said transformed versions of data saved to said warehouse cache include metadata associated with said transformed versions of data.

12. A database system in accordance with claim 8, wherein said transformed versions of data saved to said warehouse cache include index data associated with said transformed versions of data.

13. A database system in accordance with claim 8, wherein said warehouse cache comprises multiple caches wherein said transformed versions of data are distributed among different ones of said multiple data storage systems.

14. A database system in accordance with claim 13, wherein said multiple caches are organized in a cache hierarchy that can store multiple synchronized transformed versions of data.

15. A method for caching data within a database system, said database system comprising a processor and a non-transitory storage medium containing instructions executable on said processor for executing a database management system (DBMS) and multiple data storage systems accessible to said DBMS providing different kinds of file organization, different kinds of data organization, and different forms of storage access;

the method comprising the steps of:

caching to a warehouse cache transformed versions of data read from a first one of said multiple data storage systems to a second one of said multiple data storage systems during query executions by said DBMS, said transformed versions of data comprising multiple copies of said data in multiple formats including respective file formats or data formats, said transformed versions of data concurrently stored within said warehouse cache being available for use in subsequent query executions by said DBMS, and said transformed versions are physically distinct from one another.

16. A method in accordance with claim 15, wherein said multiple data storage systems include an external cloud object storage and at least one of:

a managed cloud storage;

a block storage; and a database compute node memory.

17. A method in accordance with claim 16, wherein said transformed versions of data include at least one of:

data read from said external cloud object storage, transformed, and saved as managed data within said managed cloud storage;

data read from said external cloud object storage, transformed, and saved to said block storage;

data read from said managed cloud object storage, transformed, and saved to said block storage;

data read from said external cloud object storage, transformed, and saved to said database compute node memory;

data read from said managed cloud object storage, transformed, and saved to said database compute node memory; and data read from said block storage, transformed, and saved to said database compute node memory.

18. A method in accordance with claim 15, wherein said transformed versions of data saved to said warehouse cache include metadata associated with said transformed versions of data.

19. A method in accordance with claim 15, wherein said transformed versions of data saved to said warehouse cache include index data associated with said transformed versions of data.

20. A method in accordance with claim 15, wherein said warehouse cache comprises multiple caches wherein said transformed versions of data are distributed among different ones of said multiple data storage systems.

21. A method in accordance with claim 20, wherein said multiple caches are organized in a cache hierarchy that can store multiple synchronized transformed versions of data.

* * * * *